United States Patent Office 3,763,136
Patented Oct. 2, 1973

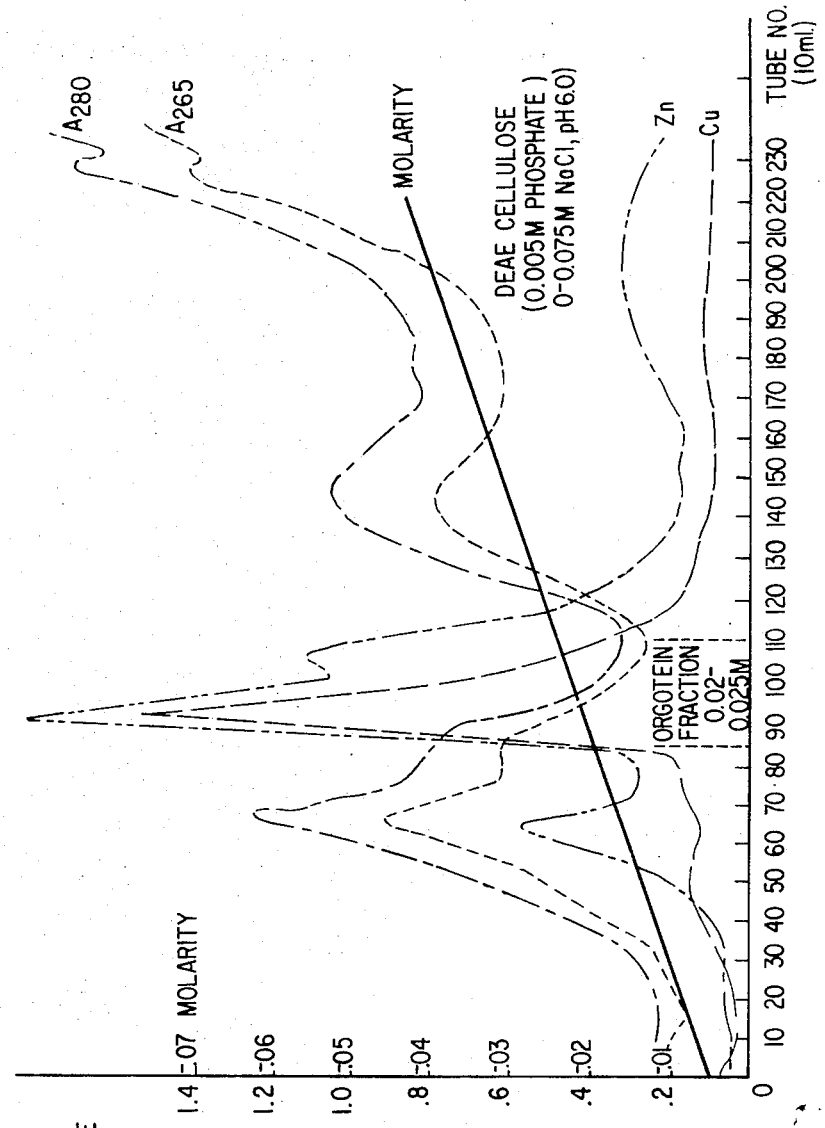

3,763,136
ONE-STEP CHROMATOGRAPHIC ISOLATION OF ORGOTEIN
Wolfgang Huber, San Francisco, Silver H. Chow, Sunnyvale, and Mark G. Saifer, Berkeley, Calif., assignors to Diagnostic Data, Inc., Mountain View, Calif.
Filed Dec. 7, 1971, Ser. No. 205,609
Int. Cl. C07g 7/04
U.S. Cl. 260—113
18 Claims

ABSTRACT OF THE DISCLOSURE

Substantially pure orgotein is obtained in a single chromatographic purification step from the mixture of soluble proteins present in beef liver and other animal tissues by chromatographing an aqueous solution of the mixture of proteins having a pH of about 6 and an ionic strength below about 0.01 over a DEAE-cellulose or other weakly basic ion exchange column; eluting a portion of the adsorbed proteins from the column with aqueous eluant of ionic strength below about 0.02 M until a drop in 265 and 280 nm. absorbances is accompanied by a rise in divalent metal ion content; selectively eluting the adsorbed orgotein with aqueous eluant of a higher ionic strength from about 0.02 to 0.03 M ionic strength while measuring the divalent metal content of the eluate; and separating orgotein from that portion of the eluate having the maximum divalent metal content.

BACKGROUND OF THE INVENTION

This invention relates to a process for the production of substantially pure orgotein.

Orgotein defines a family of protein congeners having a characteristic combination of physical, chemical and pharmacological properties. Each of these congeners is characterized physically by being the isolated, substantially pure form of a globular, buffer and water-soluble protein having a highly compact native conformation which, although heat labile, is stable to heating for several minutes at 65° C. in water or a buffer solution containing a salt of a divalent metal having an ionic radius of 0.60 to 1.00 A. and which on gel electrophoresis at pH 8.45 in .01 M trisglycine buffer gives a characteristic multiple-band pattern. Chemically, each is characterized by containing all or all but one of the essential aminoacids, a small percentage of carbohydrate, no lipids, 0.1 to 1.0% metal content provided by about 3 to 5 gram atoms per mole of one or more chelated divalent metals having an ionic radius of 0.60 to 1.00 A., and substantially no chelated monovalent metals or cell poisons in the molecule. Pharmacodynamically, each of the congeners is characterized by being a nontoxic, immunologically well-tolerated, injectable protein whose pharmacological activity includes anti-inflammatory activity which, like its compact conformation, is related to its chelated divalent metal content. Immunological relatedness of an orgotein congener is sufficient to enable its antibodies prepared in the rabbit or other suitable animal to recognize as an antigen one or more other orgotein congeners and/or for one or more of the antibodies to other orgotein congeners to recognize it as an antigen, as evidenced in gel immunoelectrophoresis and/or gel immunodiffusion. Although some of the physical and chemical properties and the type and degree of pharmacodynamic efficacy of orgotein vary from congener to congener, all orgotein congeners possess the above combination of properties.

From recent literature data, it is now apparent that the orgotein family of metalloproteins includes the proteins previously isolated in various states of purity and given the names hepatocuprein, Mann and Keilin, Proc. Royal. Soc. for Biol. Sci., 126, 303 (1939); cerebrocuprein, Porter and Ainsworth, J. Neurochem., 1, 260 (1957); erythrocuprein, Markowitz et al., J. Biol. Chem., 234, 40 (1959); and cytocuprein, Carrico & Deutsch, J. Biol. Chem., 244, 6087 (1969). For other references, see Mohamed and Greenberg, J. Gen. Physiol., 37, 433 (1954); Porter and Folch, Arch. Neurol. Psychiat., 77, 8 (1957); Porter and Ainsworth, J. Neurochem., 5, 91 (1959); Krimmel et al., J. Biol. Chem., 234, 46 (1959); Wyman, Biochem. Biophys. Acta, 45, 387 (1960); Shields et al., J. Clin. Inv., 40, 2007 (1961); Markowitz et al., Anal. Chem., 33, 1594 (1961); Porter et al., Arch. Biochem. Bioph., 105, 319 (1964); Stansell and Deutsch, J. Biol. Chem., 240, 4299 (1965); ibid., 240, 4306 (1965); Stansell and Deutsch, Clin. Chem. Acta, 14, 598 (1966); McCord and Fridovich, J. Biol. Chem., 243, 5753 (1968); McCord and Fridovich, J. Biol. Chem., 243, 6056 (1968); Hartz and Deutsch, J. Biol. Chem., 244, 4565 (1969); Carrico and Deutsch, ibid., 245, 723 (1970); Wood, et al., Eur. J. Biochem., 18 (1971), 187. With these observations it has now become apparent that the family of orgotein congeners includes these metalloproteins; since orgotein possesses pronounced superoxide dismutase activity, its relationship to the mammalian form of this enzyme also has been established. These metallo-proteins have been reported to possess very high superoxide dismutase (sodase) activity. See McCord and Fridovich, J. Biol. Chem., 244, 6049 (1969); Keele, McCord and Fridovich, J. Biol. Chem., 245, 6176 (1970); ibid., 246, 2875 (1971).

In application Ser. No. 576,454, filed Aug. 31, 1966, now abandoned (Belgium Pat. 687,828, British Pat. 1,160,151), there is disclosed a multi-step process for the isolation of orgotein from animal tissue, e.g., bovine liver.

In application Ser. No. 150,809, filed June 7, 1971, now U.S. Pat. 3,687,927, there is disclosed an improved process for the isolation of orgotein from beef liver and other animal tissues which eliminates several steps and increases the yield substantially.

In U.S. Pat. 3,579,495, there is claimed a process for the isolation of orgotein from red blood cells by a multi-step process which includes a solvent pre-purification to remove the hemoglobin and a heating step, in an overall yield of about 0.01%, calculated on the packed red cells.

In some of the literature references cited above, a DEAE-cellulose chromatographic purification step was used as part of a multi-step process for isolating orgotein from beef liver and other animal tissues. In one of these processes, Carrico et al., J.B.C., 244, 6087–6093 (1969), the mixture of extracted soluble proteins are subjected to three chromatographic purifications, followed, in each instance, by dialysis and then by a Sephadex G–75 gel filtration. This process, while acceptable on a laboratory scale, is not practical on a commercial scale. Moreover, the overall yield was only 0.0065%.

It has been discovered that by the process of this invention orgotein of pharmaceutically acceptable purity can be obtained in a single chromatographic purification step, making the process extremely practical on a commercial scale.

The simplicity and economy of the instant process is such that overall production and material costs are about one-tenth the lowest costs heretofore possible on a commercial scale.

SUMMARY OF THE INVENTION

According to this invention, substantially pure orgotein is isolated from a soluble buffer extract of animal tissue containing orgotein in a single chromatographic purification step, which comprises the steps of chromatographing an aqueous solution of the mixture of proteins having a pH of about 6 and an ionic strength below about 0.01 over a DEAE-cellulose or other weakly basic ion exchange column; eluting a portion of the adsorbed proteins from the column with aqueous eluant of ionic strength below about 0.02 M until a drop in 265 and 280 nm. absorbances is accompanied by a rise in divalent metal ion content; selectively eluting the adsorbed orgotein with aqueous eluant of a higher ionic strength from about 0.02 to 0.03 M while measuring the divalent metal content of the eluate; and separating orgotein from that portion of the eluate having the maximum divalent metal content.

DETAILED DISCUSSION

A wide- variety of animal tissue can be employed in the process of this invention.

The starting material for the process of this invention is a mixture of buffer soluble proteins extracted from animal tissue.

The term "animal tissue" as used herein means any organ, muscle or related tissue. Excluded is blood and any fraction thereof, which has a much higher proportion of other soluble proteins to orgotein, viz., hemoglobin and carbonic anhydrase, and thus requires different techniques for their removal. Of the animal tissues, liver, especially bovine liver, is preferred, since it has a high concentration of orgotein. Other tissues which can be used are kidney, heart, brain, spleen, viscera, muscle, testes, cervical glands, lung, tongue, thymus and pancreas. Examples of preferred species of animals whose tissue can be used as a source of orgotein-containing mixtures of buffer soluble proteins are bovine, galliformes, porcine and equine. Other are sheep, goat, rabbit, dog, rat, human, etc. The soluble proteins from bovine tissue are preferred.

The starting mixture of orgotein-containing buffer soluble proteins can be obtained by thoroughly mixing the animal tissue with the selected aqueous extractant. To release the soluble proteins from the insoluble proteins, the tissue should be minced as finely as possible. For example, the tissue can be pre-ground to a pulp in a meat grinder and then thoroughly mixed with the selected extracting liquid, e.g., in high-speed blending equipment.

The ratio of extractant to animal tissue is not critical and is dictated primarily by the physical handling characteristics of the mixture. A very low ratio reduces somewhat the yield of orgotein extracted from the tissue and produces a sludge-like mixture which is difficult to separate and the liquid phase retains excessive amounts of colloidal material which tends to clog the chromatographic column. A very high ratio has no advantage and results in a dilute solution of extracted proteins which is more difficult to handle because of its volume.

Generally, a volume ratio of extractant to animal tissue of from about 2:1 to 4:1, preferably about 2.3:1 to 2.8:1, is employed.

The extractant can be water, a mixture of water and a miscible organic solvent, e.g., acetone, methanol, ethanol, or preferably a buffer solution of relatively low ionic strength, e.g., 0.01–0.05 M, preferably about 0.02–0.03 M. Although the extractant can be virtually any pH, e.g., about 4–9, a slightly alkaline pH, e.g., between 7 and 9, preferably about 7.5–7.8 is preferred, especially when the animal tissue is liver.

When a buffer solution is employed as the extractant, the buffer can be any which provides the selected pH. Examples are salts of phosphoric acid, boric acid, cacodylic acid, citric acid, acetic acid, succinic acid, maleic acid, collidine-HCl, tris-glycine-HCl, etc. See also J. Gomori, "Methods in Enzymology," vol. I, pp. 136–146 (1955), especially buffers No. 5–8 and 10–18. A preferred buffer, especially when extracting liver, is tris-glycine buffer, pH 7.5.

The buffer can also contain other salts and other materials to alter its extracting characteristics. NaCl, KCl, MnSO$_4$ or other non-buffering salt can be employed to increase the ionic strength of the extractant. A soluble saccharide, e.g., glucose, sucrose, etc., can also be added to facilitate extraction by making the buffer more selective.

The mixture of suspended tissue particles and aqueous extract are separated by any convenient means, e.g., pressure or vacuum filtration or centrifugation, preferably the latter. The extract can, if desired, then be clarified by filtration through filter aid or any other conventional method.

If the separated extract has an ionic strength higher than about 0.01 M, it will be necessary to reduce its ionic strength in order to ensure preferential adsorption of the orgotein on the ion exchange resin. This is most conveniently accomplished by dilution or by dialysis, e.g., against water or preferably a low ionic strength buffer, most preferably the buffer which will be employed in the chromatographic separation, e.g., phosphate.

Because dissolved salts markedly affect the adsorbability of the orgotein on the chromatographic adsorbant, the solution of extracted soluble proteins should have a low ionic strength, i.e., less than about 0.01 M, e.g., 0.001–0.005 M. If the solution has a higher ionic strength, it can readily be reduced by dilution or by simple membrane dialysis against water or a buffer solution of about $1-5 \times 10^{-3}$ M ionic strength, preferably the same buffer to be used in the chromatographic separation, e.g., phosphate.

The extract nature of the salt providing the ionic strength to the starting solution is not critical. Phosphate salts are preferred because the desired pH of about 6 can readily be maintained by this buffer at the desired low ionic strength. Others are salts of boric acid, cacodylic acid, citric acid, acetic acid, succinic acid, maleic acid, collidine-HCl, tris-glycine-HCl, etc. See also J. Gomori, "Methods in Enzymology," vol. I, pp. 136–146 (1955), especially buffers No. 5–8 and 10–18.

The process of this invention is preferably conducted throughout at a pH of about 6, i.e., 5.7–6.3, including the step of adsorbing the orgotein on the chromatographic adsorbant. However, it is the selective elution step, more than the adsorbing step, whose operability is dependent upon pH. Therefore, although it is not preferred, the starting solution of soluble proteins can have a somewhat higher or lower pH, e.g., 4–8. In such a case, the chromatographic absorbant should then be equilibrated before sample loading and thereafter to the eluting pH of about 6 before attempting to selectively elute the orgotein therefrom.

The chromatographic adsorbant employed in the process of this invention is an ion exchange resin having weakly basic groups having an attraction for acidic ions. Examples are the known cellulose and polysaccharide ion exchange resins, including the lower-alkylamino-lower-alkyl-celluloses, e.g., diethylaminoethyl-cellulose (DEAE), triethylaminoethyl-cellulose (TEAE), diethylaminoethyl-Sephadex and QAE-Sephadex (quarternary aminoethylated cross-linked dextran resin). Such resins generally have an absorptive capacity of from about 1.0 to 5 milliequivalents per gram. For example, DEAE-cellulose may have a capacity of 1.0 milliequiv./g. (dry weight); DAEA-Sephadex, $3.5 \pm 0.5$ milliequiv./g.; and TEAE-Sephadex, 0.55 to 0.75 milliequiv./g. DEAE-cellulose, TEAE-celluose and cross-linked dextran resins containing diethylaminoethyl groups, especially the former, are preferred. Fibrous DEAE-celluose is preferred because of its flow rate, which is higher than microgranular forms. However, the latter has somewhat higher resolution power.

The orgotein is isolated by selective elution from the ion exchange resin. The process of this invention involves adsorbing the orgotein along with other proteins from the mixture onto a column of the ion exchange resin, washing any hemoglobin and other non-absorbed proteins from the column; thereafter selectively eluting the orgotein from the column and recovering the orgotein from the fraction of the eluate containing substantially pure orgotein. Although these steps are ordinarily conducted with the resin as the bed of a chromatographic column, it will be apparent to those skilled in the art that obvious equivalent variations can be employed, e.g., slurry the resin with the solution of starting soluble proteins.

The amount of ion exchange resin employed, although not critical, affects the yield and purity of the isolated orgotein. Preferably about 0.25 to 0.5 ml. of resin per about 100 milligrams of extracted proteins is employed, based on about 15% of soluble proteins in the starting tissue. A greater ratio (vol./wt.) of resin to proteins does not have any particular advantage over a ratio of about 0.5 ml./100 mg. Because any hemoglobin and myoglobin in the starting solution of proteins is not absorbed on the ion exchange resin below its isoelectric point, its removal along with other non-adsorbed proteins is readily accomplished by washing the column with an aqueous eluant, preferably one having a pH of about 6. To prevent elution of the orgotein, the ionic strength of the aqueous media should be less than about 0.01 M. Water or preferably a buffer as defined above, especially phosphate buffer, can be employed in this step. Often only several times the void volume of the column is required to free the column of hemoglobin and other non-absorbed proteins. Hemoglobin removal can readily be determined from the color of the effluent.

Having removed any hemoglobin and other non-adsorbed proteins from the column, the next step is the separation of the orgotein from the other adsorbed proteins in a manner which yields an eluate containing substantially pure orgotein. This can be accomplished by selectively eluting the orgotein from the column employing an aqueous eluant having a pH of about 6, i.e., 5.7 to 6.3, and varying ionic strength so that the adsorbed proteins are sequentially eluted. A vital aspect of this invention, which employs a single chromatographic step to isolate substantially pure orgotein, is the elution of the proteins in a sequence which provides an eluate fraction containing substantially pure orgotein. To accomplish this, the adsorbed proteins are gradually eluted from the column and the divalent metal content and, preferably also, the $A_{265}$ and/or $A_{280}$ absorbances of the eluate are monitored.

As stated above, it is most important that the pH of the eluting media be about 6 at the ionic strengths used. At other pH other proteins are eluted at the same time as the orgotein, in amounts which result in the production of highly impure rather than substantially pure orgotein.

A convenient method of sequentially eluting the adsorbed proteins from the resin is the use of a buffer of an ionic strength gradually increasing from below about 0.01 M to above 0.03 M. In the case of DEAE-cellulose, a substantial portion of the undesired proteins are eluted at an ionic strength of less than 0.02 M. The orgotein is eluted, with about 0.02–0.03 M buffer and the remaining undesired proteins are eluted at higher ionic strength. Generally, a final ionic strength of at least about 0.1 M and up to about 2 M is employed to ensure clearing of the column so that it can be regenerated for re-use.

Instead of a gradually increasing ionic strength gradient, a step-wise gradient can be employed, e.g., about .001–.005 M to elute the easily elutable protein impurities, about .02–.03 M to elute the orgotein, and about 0.1–2.0 M to clear the column of residual protein impurities.

Irrespective of whether the resin is eluted with buffer of continuously increasing or step-wise increasing ionic strength, in order to obtain orgotein of high purity, it is important that as well selected a cut as possible be taken. Thus, to a certain degree, overall yield must be balanced against final purity. However, if the cut is taken at precisely the optimal point, a high yield of substantially pure orgotein is obtained. An essential aspect of this invention is accurately determining the point at which the orgotein cut should be taken.

The location of the fraction of the eluate containing substantially pure orgotein is determined from measurement of divalent metal content and preferably also at least one of 280 nm. and 265 nm. absorbances of the eluant, continuously or at frequent regular intervals. Since the eluant will not ordinarily otherwise contain significant amounts of divalent metal ion, the elution of the orgotein can be detected by a pronounced increase in divalent metal content of the eluate. Since orgotein usually occurs in its natural state as a Cu-Zn mixed chelate, measurement of the copper content or preferably both copper and zinc contents provides a precise method for detecting orgotein in the eluate.

To obtain a cut containing orgotein of highest purity, the $A_{280}$ and $A_{265}$ absorbances of the eluate are also measured. Within the eluate fraction having substantial Cu and Zn contents, the beginning of the orgotein cut is taken at the point where there is a rise in Cu and Zn contents accompanied by a drop in 265 and 280 nm. absorbances. The end of the cut is signaled by a sharp drop in Cu and Zn contents and a sharp rise in 265 and 280 nm. absorbances. Only one of Cu and Zn contents and one of the 265 and 280 nm. absorbances need be taken to determine these points. However, preferably all four values are determined. When both 265 and 280 nm. absorbances are taken, the beginning of the orgotein cut can also be determined by the $A_{265}/A_{280}$ ratio, viz., the orgotein cut is taken at the point where this ratio reaches a maximum, i.e., is close to or greater than one. The end of the orgotein cut is taken at the point where the $A_{265}/A_{280}$ ratio again drops, indicating an increase in content of non-orgotein proteins.

A convenient method for instantaneously determining divalent metal content is by atomic absorption spectrophotometry. Apparatus useful for simultaneous measurement of copper and zinc is Model 353, Instrument Laboratories, Inc., Lexington, Mass.

$A_{265}$ and $A_{280}$ absorbances can be determined continuously or intermittently in a conventional manner or ratios may be recorded directly by a differential spectrophotometer.

With reference to the drawing, there is shown curves of the Cu and Zn contents and $A_{265}$ and $A_{280}$ absorbances of the eluate of the ion exchange chromatography described in Example 2. These measurements were made for each aliquot of eluate. As the curves show, Cu and Zn contents rise precipitously when the molarity of the eluate reaches about 0.018 M. After peaking from about 0.022–0.025 M, these contents drop precipitously. $A_{265}$ and $A_{280}$ absorbances reveal a sharp increase in non-orgotein protein content at 0.022 M with a drop in the $A_{265}/A_{280}$ ratio. This is followed by a gradual rise in absorbance to a peak at about 0.04 M.

Alternatively, the orgotein and other residual adsorbed proteins, can be eluted simultaneously from the ion exchange column, e.g., with 0.005 M phosphate buffer brought to ionic strength of about 0.02–0.04 with NaCl, and orgotein isolated from the eluted mixture of proteins by a heat treatment, a second basic ion exchange resin chromatographic separation, or any combination thereof.

Pure orgotein can be produced by a heat treatment of the DEAE-cellulose pre-purified orgotein as described in U.S. Pat. 3,579,494 or U.S. Pat. 3,624,251. Alternatively, a second ion exchange chromatographic purification can be conducted as described above or as claimed in co-pending abandoned application Ser. No. 3,538, filed Jan. 16, 1970.

In other variations, the column which has been freed of all proteins which can be removed therefrom with eluant of ionic strength below about 0.01 M is freed of most or all of the residual non-orgotein proteins adsorbed thereon by heating the column to 65–70° C. for about 5–20 minutes, e.g., by passing heated 0.005 M phosphate buffer therethrough.

Orgotein can be isolated from the eluate in a conventional manner, e.g., by lyophilization, preferably after dialysis against deionized water to remove buffer ions.

The orgotein isolated by the process of this invention is of high quality and can be injected without immunologic side-reactions. As disclosed in U.S. Pat. 3,579,495, Belgium Pat. 687,828 and British Pat. 1,160,151, orgotein is useful, inter alia, as an anti-inflammatory agent. The thus-isolated orgotein may, however, contain trace amounts of extraneous proteins which, although they do not produce an immediate immunologic reaction, have the potential capability of doing so upon long-term parenteral administration. These trace proteins can be eliminated in several ways. One such way is by gel filtration using a microporous resin, e.g., Sephadex G-75 (epichlorohydrin cross-linked dextran resin, Pharmacia, Sweden). The Sephadex has been swelled, refined and washed by standard techniques described in literature of the manufacturer. The packed columns are equilibrated with 0.05 tris-HCl pH 7.5, 0.15 M KCl, 0.005 glycine, $10^{-4}$ M $Cu^{++}$, $10^{-5}$ $Zn^{++}$ buffer and adjusted to flow rate of about 2.0 ml./cm.$^2$ per hour. The addition of 5–10% dextrose or sucrose to the solution improves uniformity of application which improves subsequent resolution. After application to the column, the column is developed with additional buffer solution. Individual fractions are collected. The emergence of peaks is determined by measuring the absorbance anywhere from 200 to 280 nm.

Ultra-pure orgotein can also be produced from the DEAE-cellulose isolated orgotein by a post-heat treatment of the portion of the eluate containing the orgotein and $Cu^{++}$ and $Zn^{++}$, e.g., at 65–75° C. for 15 minutes at pH 5.8 followed by centrifugation and dialysis; by a second DEAE-cellulose ion exchange chromatographic purification; or by treatment with a proteolytic enzyme, all as described above.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Orgotein from beef liver

Cut beef liver (212 g.) into strips 2 cm. wide, remove connecting tissue and blood vessels, wash to remove blood and homogenize at top speed in a high speed blender (Osterizer) with 3.8 ml./g. of liver of 0.025 M tris-HCl buffer, pH 7.5, in 0.3 M surcose and 0.05 M KCl. Centrifuge (20,000 G; 0° C.; 60 min.); separate the centrifugate; dialyze the supernatant into 0.005 M phosphate, pH 6.0; centrifuge again and filter through a micropore filter (Versapore) to obtain a clear solution.

Apply the filtrate directly to a diethylaminoethyl-cellulose ion exchange column (ca. 40 g.; 2.5 cm. x 40 cm.) (DE-23, fibrous, W. & R. Balston, Ltd., Hardstone, Kent, England). Wash the column (flow rate: 200 ml./hr.) with one liter of phosphate buffer (0.005 M, pH 6.0) and thereafter with four liters of the same buffer containing NaCl in an amount increasing continuously in a shallow gradient from 0 to $7.5 \times 10^{-2}$ M; flow rate: 200 ml./hr. Measure $A_{265}$ and $A_{280}$ absorbances of the eluate and continuously monitor the Cu and Zn contents thereof by atomic absorption spectrophotometry (Instrumentation Laboratories, Inc., Lexington, Mass., Model 353). After collecting one liter of eluate containing no NaCl and 750 ml. of eluate containing gradually increasing amounts of NaCl or KCl, at which point the molarity gradually reaches about 0.018 M, the $A_{265}$ and $A_{280}$ nm. absorption values drop to low values and Cu and Zn contents rise sharply. The eluate which is thereafter collected, up to the point where Cu content again drops to a minimum and molarity reaches about $2.8 \times 10^{-2}$ M (550 ml. of eluate) contains 240 mg. of orgotein of good purity. The narrower the cut taken from this portion of the eluate, the higher the purity will be of orgotein isolated therefrom and the lower the yield thereof.

Orgotein of highest purity is present in the eluate having an ionic strength of about 0.022 M (at 950 ml. of total eluate). At this point, Cu and Zn absorption curves both exhibit peaks. Dialysis of the 750 ml. to 1,300 ml. fraction of the eluate against water to a conductivity of $0.04\mu$ mho, filtration through a micropore filter (Millipore, $0.22\mu$) and sterile lyophilization, preferably after mixing with about two times by weight of sucrose, calculated on the orgotein, yields isolated, fully active, non-antigenic, injectable orgotein of a quality comparable to that presently prepared commercially for veterinary use.

If desired, the washing of the column to remove non-adsorbed and lightly adsorbed proteins before eluting the orgotein can also be accomplished at a constant ionic strength or step-wise or continuously increasing ionic strength, e.g., eluting the column with the above-described buffer solution having an ionic strength of about 0.012 M to about 0.015 M, until $A_{265}$ and $A_{280}$ absorptions drop to minimum values, and then eluting the orgotein at a constant (e.g., about 0.02 M) or stepwise increasing or continuously increasing ionic strength within the range of about 0.018 M and about 0.028 M. The column can then be cleared of residual adsorbed proteins by increasing the ionic strength of the eluant to about 0.1 M or higher.

Following the procedure of Example 1, comparable results are obtained using TEAE-cellulose and a cross-linked dextran resin containing diethylaminoethyl groups (DEAE-Sephadex).

Following the procedure of Example 1, comparable results are obtained starting, respectively, with the soluble proteins extracted from bovine brain, kidney, spleen, lung, testes, pancreas, thymus, viscera and muscle tissue, and the same tissues from pigs, horses, sheep and chickens.

EXAMPLE 2

Orgotein from beef liver

Follow the procedure of Example 1, using DE-52, Microgranular DEAE-cellulose, as the ion exchange resin. This resin has the advantage of giving a sharper separation of orgotein from the other proteins but has the disadvantage of a lower flow-rate.

The elution gradient for the orgotein cut is from 0.020 to 0.025 M (tubes 85–110 of 10 ml. each) yielding 165 mg. of orgotein of good purity. Preferably the cut is taken at from 0.020 to 0.023 M (tubes 85–100) since the narrower cut gives orgotein of higher purity with virtually no loss of the orgotein. Even narrower cuts, e.g., tubes 88–92, give lower yields of orgotein of even higher purity.

EXAMPLE 3

Pre-purified orgotein

If desired, a portion of the soluble proteins extracted from the liver as described in Example 1 can be subjected to a pre-purification fractionation with ammonium sulfate. Adjust the supernatant ($\sim$1,600 ml., pH 6.5–6.8) from the centrifuged extract to pH 7.5 with 3 N NH$_4$OH. Add 25 g./100 ml. solid ammonium sulfate at room temperature with stirring to bring the solution to 40% of saturation. Maintain pH at 7.5 throughout. Stir an additional 30 min. at room temperature and then centrifuge the copius precipitate at 20,000 G and 0° C. for about two hours. Decant supernatant and titrate to pH 5.0 (4° C.) with 10% H$_2$SO$_4$ and then add 22 g. or 35 g./100 ml. of solid (NH$_4$)$_2$SO$_4$ thereto incrementally to bring the concentration to 70% or 80% of saturation. Centrifuge the copius precipitate at 20,000 G (0° C.) for about one hour. Discard the supernatant and dissolve the precipitate in a minimal volume (100 ml.) of deionized water. Dialyze into 0.005 M phosphate buffer (pH 6.0) until negative to SO$_4$= ($\sim$6 changes of 4 liters each). Clarify by centrifugation at 20,000 G (0° C.). Adjust supernatant to pH 6.0. This solution can then be applied to a DEAE-cellulose chromatographic column in the manner described in Example 1.

Post-purified orgotein

To produce ultrapure orgotein, using a microporous gel which acts as a molecular sieve, dissolve the orgotein lyophilizate obtained as described above in Example 1 in 0.05 M tris-HCl buffer (pH 7.5; 0.15 M KCl; 0.005 M glycine, 0.02% sodium azide, $10^{-4}$ $Cu^{++}$, $10^{-5}$ $Zn^{++}$, 4° C.) at a concentration of about 70 mg./ml. Clarify by centrifugation, if necessary, and apply to G–75 Sephadex column (3.2 x 96 cm., bed volume ~775 ml.), calibrated with the same buffer containing $10^{-4}$ M $Cu^{++}$ and $10^{-5}$ M $Zn^{++}$. Collect the eluate in 5.4 ml. fractions and measure the $A_{265}$ and $A_{280}$ absorptions thereof. Beginning at about fraction 50, these absorptions climb precipitously and reach a peak at about fraction 68. Fractions 66–73 contain a majority of the total orgotein in an ultrapure state. By fraction 98, these absorptions fall to zero until about fraction 116. The only significant impurity appears in tubes 118–150.

The orgotein obtained according to the above examples can also be further purified by re-chromatography over an anion exchange resin.

To prepare the column, stir 30 g. of Whatman DEAE cellulose-52, microgranular (W. & R. Balston, Ltd., Hardstone, Kent, England) into 300 ml. of 0.1 M phosphate buffer, pH 6.0. Allow the slurry to settle and decant the supernatant. Add 0.01 M phosphate buffer, pH 6.2, and stir the mixture thoroughly. Allow the slurry to settle for 10 minutes and decant the supernatant. Wash the cellulose with the starting buffer until both the pH and the conductivity remain constant at the correct values. Apply gentle vacuum to the slurry to remove occluded air and carbon dioxide. The slurry should be used immediately for column packing. If the resin is left in contact with buffers or polyelectrolytes for longer than one week, a preservative, e.g., toluene, should be added.

Fit a glass column of 1.5 cm. diameter with a nylon net and mount a Millipore filter support unit at the bottom vertically. Fill the column with 0.01 M sodium phosphate buffer, pH 6.2 and pour the equilibrated and relatively thick DEAE-cellulose slurry (about 120–150 percent of original volume) into the column through a funnel attached to the top of the column. Keep bottom column tap closed until 1 cm. of the cellulose has settled at the bottom and then open the bottom column tap to allow free flow. Pack a column of about 20 cm. using settling times of 20–30 minutes. Remove the slow sedimenting fines at the and the buffer. Adjust flow rate by hydrostatic pressure by running starting buffer through the column for several hours or overnight. Check pH and conductivity of the eluate to ensure full equilibrium between the exchanger and the buffer. Adjust flow rate by hydrostatic presure by placing the buffer source about 40 cm. above the head of the column, which will produce a flow rate of about 30 ml. per hour for a column of 1.5 cm. in diameter and 20 cm. in height with a bed volume of 30 ml.

Dissolve 100–200 mg. of the starting orgotein in 2–4 ml. of starting buffer and the resulting greenish solution layered gently over the surface of the bed. After absorption, the orgotein solution appears as a broad greenish band near the top of the column. Connect the column to the buffer reservoir and begin elution with 0.01 M phosphate buffer, pH 6.2. Collect five ml. fractions, using a Simplex (B. Braun, Melsungen, Germany) fraction collector. Operate the column at room temperature and cool the eluate with ice water. A brownish-pink band separate from the sample zone on the column upon application of the elution buffer which moves rapidly downward and elutes immediately after the void volume, requiring a buffer volume of 40–50 ml. After pooling of the fractions containing the rapidly eluted impurities, continue elution with 0.01 M phosphate buffer, pH 6.2, to a total volume of about 300 ml. After about 120 ml. of eluate is collected, additional material with less pronounced absorbance at 280 m$\mu$ is eluted. No further material could be eluted with 0.01 M phosphate buffer, pH 6.2.

Elution of the orgotein is caried out by stepwise or continual increase of buffer ionic strength. No significant elution is observed until ionic strength is increased to about 0.015 M. At this point the zone remaining at the top of the column migrates downward as a light green band. Complete elution is achieved with 0.028 M buffer.

The eluate fractions which contain the orgotein are pooled, extensively dialyzed and then lypohilized.

In another method of post-purifying orgotein, to the undialyzed 550 ml. of eluate from Example 1 containing the orgotein (0.018–0.028 M ionic strength), add five ml. of $10^{-2}$ N cuprous acetate and five ml. of $10^{-3}$ N zinc to bring their concentration in the eluate to about $10^{-4}$ and $10^{-5}$, respectively. Bring the eluate rapidly to 75° C. and hold at this temperature for 15 minutes, preferably under nitrogen. Cool in ice bath to <10° C. and remove the copious precipitate and dialyze against deionized water. Stabilize by dissolving therein 180 mg. of sucrose. Sterilize by filtration through a micropore filter into a sterile amopule to obtain a sterile solution, which can be lypophilized to yield pure orgotein.

Orgotein obtained according to Example 1 also can be postpurified with a carboxymethylcellulose column. A CMC column of 11 ml. was prepared and equilibrated with 0.01 molar sodium acetate, pH 5.3. 40 mg. of the above DEAE-cellulose purified orgotein was dissolved in 0.01 molar acetate buffer, pH 5.3, and dialyzed against several changes of the same buffer. Insolubles, if any, were centrifuged off and the clear supernatant was layered on top of the CMC column. Flow rate was approximately 12 ml. per hour. The column was washed with 30 ml. of 0.01 molar acetate, pH 5.3, to elute the non-adsorbed proteins. Then elution was continued with a linear gradient from 0.01 molar to 0.1 molar sodium acetate, pH 5.3, in a total volume of 200 ml. Ultrapure orgotein was eluted at 0.018 molar to 0.028 molar and isolated from the eluate in the manner described above.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the isolation of orgotein as its natural Cu-Zn mixed chelate from animal tissue wherein a mixture of orgotein and other buffer soluble proteins is subjected to a chromatographic fractionation by
   (a) applying the mixture of buffer soluble proteins as an aqueous solution having a pH of about 6 and an ionic strength of less than about 0.01 M, to a column of an ion exchange resin having weakly basic groups, thereby adsorbing the orgotein and a portion of the other proteins in the mixture on the resin;
   (b) selectively eluting a portion of the adsorbed proteins from the column with an aqueous eluant having a pH of about 6 and an ionic strength below about 0.02 M;
   (c) eluting another portion of the adsorbed proteins from the column with an aqueous eluant having a pH of about 6 and a higher ionic strength; and
   (d) isolating substantially pure orgotein from the eluate; the improvement which comprises isolating substantially pure orgotein as its natural Cu-Zn mixed chelate from the soluble proteins of the starting tissue source in a single fractionation step by
      (i) employing the soluble proteins of the starting tissue source as the starting mixture of buffer soluble proteins in the chromatographic fractiontion;
      (ii) eluting at least a portion of the adsorbed proteins at an ionic strength of between about 0.02 M and about 0.03 M while monitoring at least one of the $A_{265}$ and $A_{280}$ absorbances and measuring at least one of the Cu and Zn contents of the eluate;

(iii) separating from the portion of the eluate having an ionic strength of about 0.02–0.03 M the fraction having maximum non-ionic divalent metal content and minimum $A_{265}$ or $A_{280}$ absorbance; and (iv) isolating substantially pure orgotein from that fraction.

2. A process according to claim 1 wherein the animal tissue is liver.

3. A process according to claim 2 wherein the liver is bovine.

4. A process according to claim 1 wherein the orgotein is eluted with an aqueous eluant of an ionic strength which increases continuously in a shallow gradient.

5. A process according to claim 1 wherein the resin is a tertiary amino-cellulose or -dextran resin.

6. A process according to claim 5 wherein the resin is selected from the group consisting of diethylaminoethyl-cellulose, triethylaminoethyl-cellulose and a cross-linked dextran resin containing diethylaminoethyl groups.

7. A process according to claim 6 wherein the cellulose resin is diethylaminoethyl-cellulose.

8. A process according to claim 7 wherein the animal tissue is liver.

9. A process according to claim 8 wherein the liver is bovine.

10. A process according to claim 9 wherein the orgotein is eluted with an aqueous eluant of an ionic strength which increases continuously in a shallow gradient.

11. A process according to claim 1 wherein the starting mixture of proteins are extracted from the tissue source with a buffer having a pH between about 7 to 9.

12. A process according to claim 11 wherein the pH of the buffer is about 7.5–7.8.

13. A process according to claim 11 wherein the buffer is employed in a volume to weight ratio to the animal tissue of at least about 3:1.

14. A process according to claim 13 wherein the resin is a tertiary amino-cellulose or -dextran resin.

15. A process according to claim 14 wherein the resin is selected from the group consisting of diethylaminoethyl-cellulose, triethylaminoethyl-cellulose and a cross-linked dextran resin containing diethylaminoethyl groups.

16. A process according to claim 15 wherein the cellulose resin is diethylaminoethyl-cellulose.

17. A process according to claim 16 wherein the animal tissue is liver.

18. A process according to claim 17 wherein the liver is bovine.

References Cited
UNITED STATES PATENTS

| | | | |
|---|---|---|---|
| 3,637,640 | 1/1972 | Huber | 260—113 |
| 3,687,927 | 8/1972 | Huber | 260—113 |

OTHER REFERENCES

J. of Biol. Chem., vol. 244, 1969, pp. 4565–72, Hartz et al.

J. of Biol. Chem. vol. 244, 1969, pp. 6087–6093, Carrico et al.

J. of Biol. Chem., vol. 240, 1965, pp. 4299–4305, Stansell et al.

HOWARD E. SCHAIN, Primary Examiner

U.S. Cl. X.R.

260—115; 424—177